(12) United States Patent
Narendran

(10) Patent No.: US 8,238,240 B2
(45) Date of Patent: *Aug. 7, 2012

(54) SYSTEM AND METHOD FOR ROUTING INTERNET TRAFFIC OVER INTERNET LINKS

(75) Inventor: Paranthaman Narendran, London (GB)

(73) Assignee: Paranthaman Narendran, Bristol (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/294,119

(22) Filed: Nov. 10, 2011

(65) Prior Publication Data

US 2012/0057468 A1    Mar. 8, 2012

Related U.S. Application Data

(60) Division of application No. 13/236,817, filed on Sep. 20, 2011, which is a division of application No. 11/175,860, filed on Jul. 6, 2005, now Pat. No. 8,031,613, which is a continuation of application No. 09/627,486, filed on Jul. 28, 2000, now Pat. No. 6,973,038.

(51) Int. Cl.
  *H04J 3/14* (2006.01)
(52) U.S. Cl. .......................... 370/230; 370/419; 370/428
(58) Field of Classification Search .................. 370/229, 370/230–234, 252, 253, 413, 419, 420, 428
See application file for complete search history.

(56) References Cited

U.S. PATENT DOCUMENTS

| 4,964,119 | A | 10/1990 | Endo et al. |
|---|---|---|---|
| 5,048,011 | A | 9/1991 | Melen |
| 5,430,727 | A | 7/1995 | Callon |
| 5,999,518 | A | 12/1999 | Nattkemper et al. |
| 5,999,525 | A | 12/1999 | Krishnaswamy et al. |
| 6,011,777 | A | 1/2000 | Kunzinger |
| 6,016,307 | A * | 1/2000 | Kaplan et al. .................. 370/238 |
| 6,041,352 | A | 3/2000 | Burdick et al. |
| 6,055,571 | A | 4/2000 | Fulp et al. |
| 6,064,653 | A | 5/2000 | Farris |
| 6,078,963 | A * | 6/2000 | Civanlar et al. ............... 709/238 |
| 6,108,700 | A | 8/2000 | Maccabee et al. |
| 6,157,955 | A | 12/2000 | Narad et al. |
| 6,167,445 | A | 12/2000 | Gai et al. |
| 6,205,477 | B1 | 3/2001 | Johnson et al. |

(Continued)

OTHER PUBLICATIONS

"Quality of Service Routing in Integrated Services Networks" by Qingming Ma, dated Jan. 1998, published May 1998, Carnegie Mellon Univ., CMU-CS-98-138.

*Primary Examiner* — Ricky Ngo
*Assistant Examiner* — Wei-Po Kao
(74) *Attorney, Agent, or Firm* — Neil A. Steinberg

(57) ABSTRACT

An apparatus and method for Internet Protocol (IP) transit including a platform for routing IP traffic in real time from at least one network user to a plurality of internet links. Embodiments further include assigning different ranks to different internet links based on network monitoring. In one embodiment, a system for routing internet traffic includes an internet route optimizer to generate routing instructions for incoming data packets using a ranked list of the internet links, wherein the internet route optimizer generates the ranked list of the internet links using: (a) financial costs of routing data packets over the internet links, (b) a delay associated with routing packets over the internet links and (c) a type of data of the incoming data packets.

22 Claims, 6 Drawing Sheets

U.S. PATENT DOCUMENTS

| | | |
|---|---|---|
| 6,243,667 B1 | 6/2001 | Kerr et al. |
| 6,260,070 B1 | 7/2001 | Shah |
| 6,260,072 B1 * | 7/2001 | Rodriguez-Moral ......... 709/241 |
| 6,292,832 B1 | 9/2001 | Shah et al. |
| 6,301,244 B1 | 10/2001 | Huang et al. |
| 6,327,615 B1 * | 12/2001 | Kasper ......................... 709/213 |
| 6,373,929 B1 | 4/2002 | Johnson et al. |
| 6,446,121 B1 | 9/2002 | Shah et al. |
| 6,490,252 B1 | 12/2002 | Riggen et al. |
| 6,529,475 B1 | 3/2003 | Wan et al. |
| 6,560,648 B1 | 5/2003 | Dunn et al. |
| 6,587,438 B1 | 7/2003 | Brendel |
| 6,587,469 B1 * | 7/2003 | Bragg ........................... 370/401 |
| 6,590,867 B1 | 7/2003 | Ash et al. |
| 6,611,499 B1 | 8/2003 | D'Souza |
| 6,728,266 B1 | 4/2004 | Sabry et al. |
| 6,760,775 B1 | 7/2004 | Anerousis et al. |
| 6,775,280 B1 | 8/2004 | Ma et al. |
| 6,785,277 B1 * | 8/2004 | Sundling et al. .............. 370/392 |
| 6,788,689 B1 | 9/2004 | Turner et al. |
| 6,795,860 B1 | 9/2004 | Shah |
| 6,826,186 B1 | 11/2004 | Dittia et al. |
| 6,885,641 B1 | 4/2005 | Chan et al. |
| 6,907,000 B1 | 6/2005 | Host |
| 6,912,277 B1 | 6/2005 | Mashinsky et al. |
| 6,973,038 B1 | 12/2005 | Narendran et al. |
| 7,076,447 B1 | 7/2006 | Peyser et al. |
| 7,111,073 B1 | 9/2006 | Jain et al. |
| 7,139,242 B2 | 11/2006 | Bays |
| 7,336,613 B2 | 2/2008 | Lloyd et al. |
| 7,406,539 B2 | 7/2008 | Baldonado et al. |
| 7,467,225 B2 | 12/2008 | Anerousis et al. |
| 2004/0165528 A1 | 8/2004 | Li et al. |

* cited by examiner

SYSTEM AND METHOD FOR ROUTING INTERNET TRAFFIC OVER INTERNET LINKS

CROSS-REFERENCE TO RELATED APPLICATIONS

This application is a divisional application of application Ser. No. 13/236,817, entitled "System and Method for Routing Internet Traffic Over Internet Links", filed on Sep. 20, 2011 (still pending), which is a divisional of application Ser. No. 11/175,860, filed on Jul. 6, 2005 (now U.S. Pat. No. 8,031,613), which is a continuation application of application Ser. No. 09/627,486, filed Jul. 28, 2000 (now U.S. Pat. No. 6,973,038); these applications are hereby incorporated herein by reference in their entirety.

BACKGROUND OF THE INVENTION

1. Field of the Invention

The present invention relates to the purchase and sale of bandwidth and, more particularly, to a system and method for real-time buying and selling of bandwidth at differentiated quality of service levels, routing of excess traffic over the bandwidth purchased in real time, and billing and settlement of the transactions.

2. Description of the Related Art

The Internet is a collection of large nationwide and international networks. Many of the networks are owned and operated by telephone companies such as MCI, Sprint, ANS, and AGIS. Individual users can be directly connected to one of the networks, or indirectly connected via an internet service provider (ISP), typically a company that provides connectivity to one of the networks for a fee.

When two end users are directly or indirectly connected to the same network, data is passed between the users over the common network. If the end users are on different networks, the data is passed from one network to the other network at an interconnection point known as a network access point (NAP).

To provide connectivity to the internet, the ISP must purchase internet protocol (IP) transit, the right to transmit data onto a network at a specified data rate. For example, IP transit is commonly available at 8 Mbps, 16 Mbps, 34 Mbps, 45 Mbps, and 155 Mbps data rates, and varies in price according to the data rate selected. The higher the data rate, the higher the cost.

The amount of data traffic that an ISP experiences changes dramatically over the course of a day. FIG. 1 shows a graph that illustrates a conventional ISP traffic profile for an ISP that serves business and residential customers, respectively. As shown in FIG. 1, a traffic profile 100 peaks during the middle of the day due to business users, and again peaks in the evening due to personal users.

ISPs are keen to deliver the highest quality of internet services to their customers. One approach to doing this is to purchase a level of capacity, such as capacity level 112, that insures that sufficient capacity is available during the busiest periods. It is not cost effective, however, for an ISP to merely buy capacity to cope with their peak traffic flow.

As an industry average, ISPs tend to buy 100% more than their average traffic flow. The average traffic flow is defined as the capacity required to cope with the total flow of traffic averaged over a 24-hour period. FIG. 1 shows an average traffic flow level 114, and a doubled (100% more) traffic flow level 116.

As further shown in FIG. 1, doubled traffic flow level 116 is often insufficient to cope with bursty periods, such as bursty periods 118, which are times when traffic flows exceed the available capacity. When the amount of data to be transmitted onto the network is greater than the amount of capacity, the data is stored and output in turn as capacity becomes available. This degrades the service by significantly increasing the time required for the data to be delivered to the end user.

Most ISPs are resigned to this as an inevitable standard tradeoff between quality of service concerns and IP transit costs. Delays for accessing the Internet, however, are becoming critical issues for ISPs as customers become more discerning over their speed of internet access.

Thus, ISPs buying IP transit capacity are faced with a dilemma when determining the size of their link. If they over-dimension their network, they will have unused capacity, whilst if they under-dimension their network, they will face frequent overloads that result in poor response times for their customers.

Adding to the dilemma is the approximately 300% to 1000% per year increase in internet traffic. Further, most contracts are for one year, and for blocks of capacity. Thus, ISPs are forced to catch a moving target (the increasing Internet traffic) with a wide net (a one year block of capacity).

As a result, ISPs commonly have expensive, unutilized capacity at the beginning of a contract, and degraded quality of service by the end of the contract. Even with over-dimensioning of their IP transit requirements, ISPs are never sure that they will have enough capacity to provide an adequate quality of service during bursty periods that occur at random.

Thus, there is a need for a method that provides high quality internet service during bursty periods that costs significantly less than it would to buy a peak capacity level, such as capacity level 112, and that efficiently responds to increases in demand due to growth.

There are no real solutions within the market, but some players have attempted to address the problem. One approach is to offer usage-based billing, whereby a charge is levied based upon the volume of IP traffic transferred on the network. Another approach is for ISPs to buy monthly contracts for capacity through an exchange.

These exchanges allow networks to advertise their price for a monthly transit service. However, if an ISP does buy such a transit service, they are committed to using it for a month regardless of whether they have sufficient traffic to fully utilize capacity.

SUMMARY OF THE INVENTION

The present invention provides a system and method for real-time buying and selling of bandwidth at differentiated quality of service levels, routing of excess traffic over the bandwidth purchased in real time, and billing and settlement of the transactions. A system in accordance with the present invention includes a router that routes a plurality of data packets from a number of network users to a number of backbone providers.

The router has a number of input ports that receive the data packets, a number of output ports that transmit the data packets to the backbone providers, and switching circuitry that connects each input port to each output port. In addition, the router has traffic measuring circuitry that measures traffic levels on the input ports, identifies types of data packets, and outputs traffic information in response thereto. Further, the router has a switch controller that receives traffic information from the traffic measuring circuitry and a number of routing instructions, and controls the switching circuitry in response thereto.

The system also includes a route optimizer that is connected to the router. The route optimizer receives operating instructions, and generates routing instructions for each input port in response thereto. The routing instructions include a first routing instruction and a second routing instruction. The first routing instruction identifies an output port that is connected to a fixed-capacity bandwidth provider that can receive data packets up to a first traffic level. The second routing instruction indicates that data packets in excess of the first traffic level are to be output to a usage-based bandwidth provider that offers capacity on an as-needed basis.

The present invention also includes a method for handling overflow traffic for a bandwidth user that has purchased a total fixed amount of bandwidth capacity. The bandwidth user outputs traffic to an input port where the traffic has a traffic level. The method includes the step of monitoring the traffic level on the input port. The method also includes the step of determining if the traffic level is near the total fixed amount of bandwidth capacity. If the traffic level is near the total fixed amount of bandwidth capacity, the method determines if the bandwidth user wishes to reroute its overflow traffic. If the bandwidth user wishes to reroute its overflow traffic, the method determines if the bandwidth user has selected a provider to handle its overflow traffic. If the bandwidth user has not selected a provider to handle its overflow traffic, the method purchases capacity to handle the overflow traffic when the traffic level exceeds the total fixed amount of bandwidth capacity.

The present invention further includes a method for routing data traffic from a start point to an end destination. A plurality of bandwidth providers are connected to the start point and provide service to the end destination. The method includes the step of continually measuring an amount of time required to send data to the end destination on each of the bandwidth providers that provide service to the end destination. The method also includes the steps of statistically measuring the amount of time to form a measured response time; and assigning each bandwidth provider to one of a range of response times based on the measured response time.

The present invention additionally includes a method for ranking a list of bandwidth providers that provide service from a start point. The bandwidth providers include backbone providers and bandwidth resellers. The method includes the step of identifying each backbone provider that provides service from the start point to an end destination to form a list of backbone providers for the end destination.

The method also includes the step of removing backbone providers from the list of backbone providers when the backbone providers indicate that usage-based capacity is not available for sale to form a modified list of backbone providers. The method further includes the step of forming a list of sellers from the modified list of backbone providers. The list is formed by adding bandwidth resellers to the list when the bandwidth resellers have excess capacity on a backbone provider on the list of backbone providers, and by updating the list of sellers which have more or less capacity available due to a sale. The method additionally includes the step of ranking the list of sellers according to a factor.

A better understanding of the features and advantages of the present invention will be obtained by reference to the following detailed description and accompanying drawings that set forth an illustrative embodiment in which the principles of the invention are utilized.

DETAILED DESCRIPTION

Figure 1:
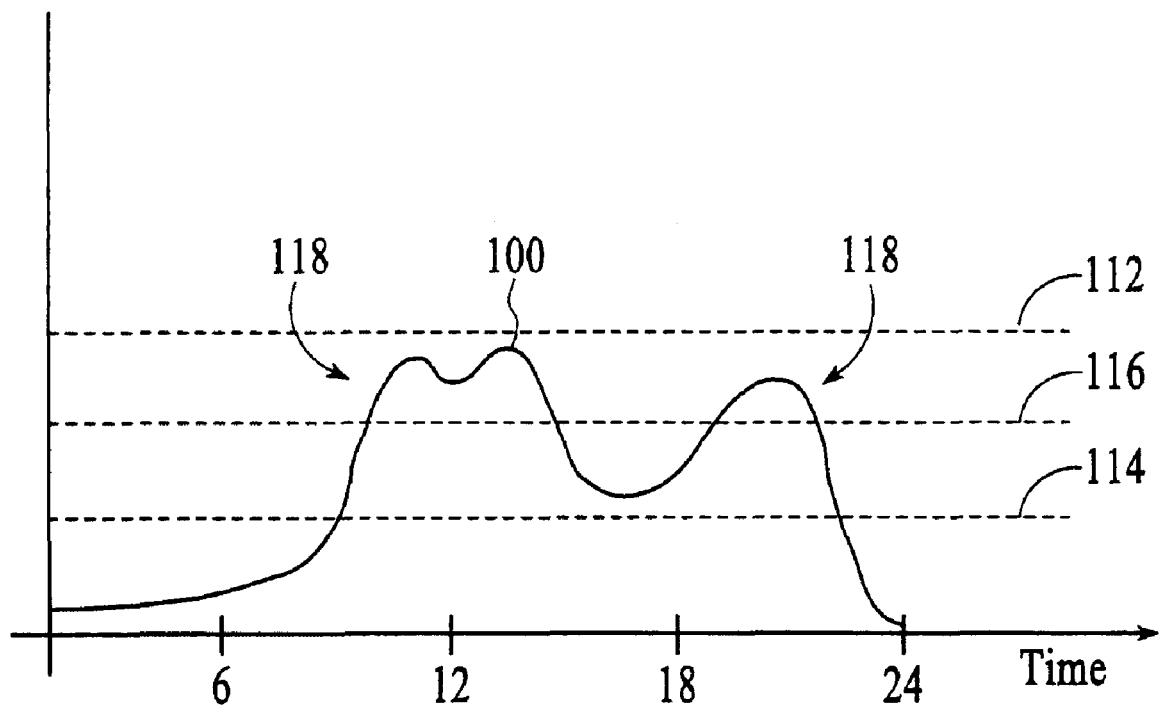
FIG. 1 is a graph illustrating a typical ISP traffic profile 100 for an ISP that serves both business and residential customers.
Figure 2:
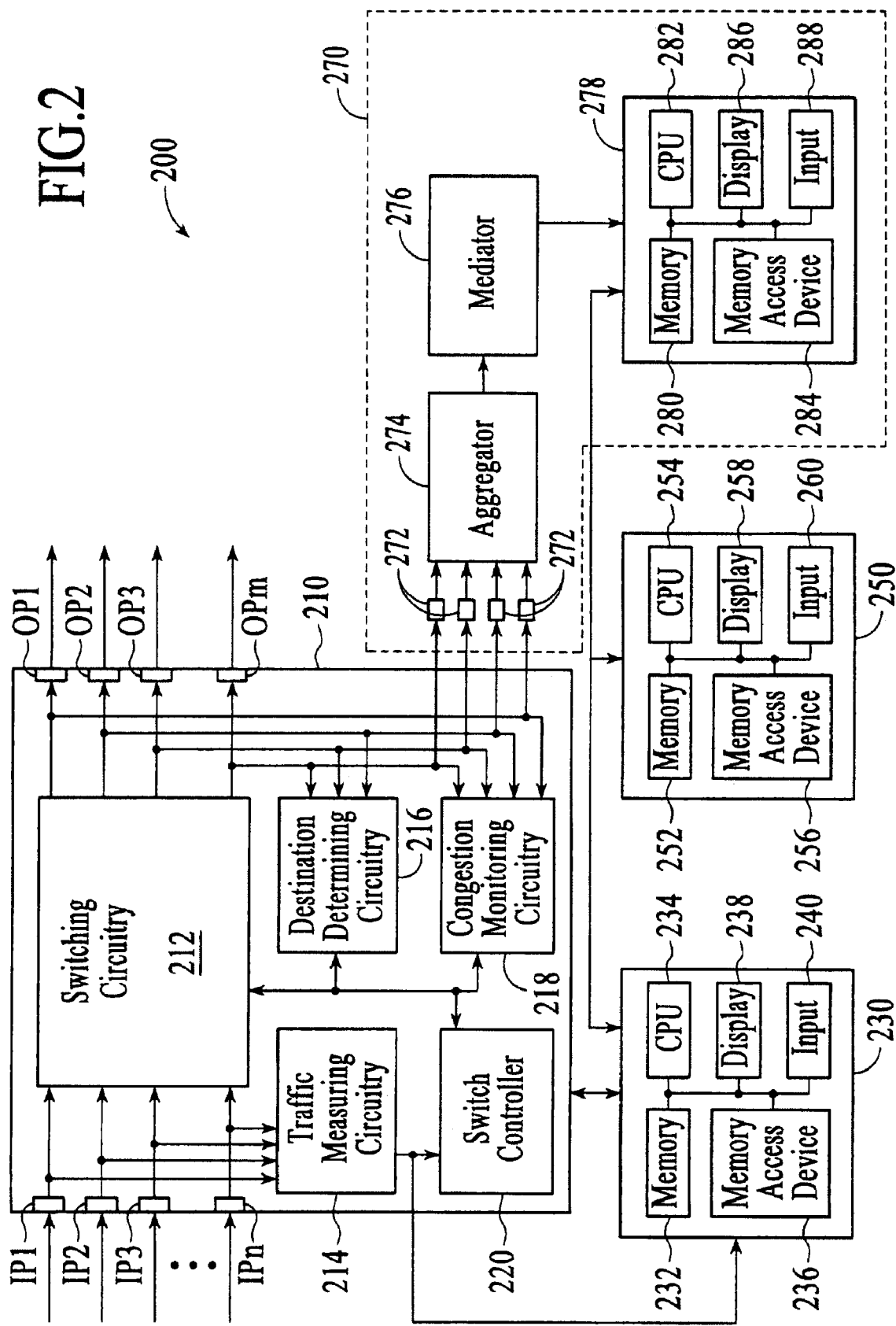
FIG. 2 is a block diagram illustrating a system 200 in accordance with the present invention.

FIG. 2 shows a block diagram that illustrates a system 200 in accordance with the present invention. As described in greater detail below, the present invention provides for real-time buying and selling of bandwidth, routing of excess traffic over bandwidth purchased in real time, and billing and settlement of the transactions. In addition, bandwidth can be purchased with different response times so that all traffic can be delivered within a time limit, or types of data can be delivered within different time limits.

As shown in FIG. 2, system 200 includes a router 210 that routes incoming data packets from network users, such as Internet service providers (ISPs), to network or backbone providers. (Backbone providers are unrelated entities that often have peering arrangements with other backbone providers to provide service to additional destinations.) Router 210 has a number of input ports IP1-IPn that receive the incoming data packets from the ISPs, and a number of output ports OP1-OPm that transmit t data packets to the backbone providers.

Router 210 also includes switching circuitry 212 that connects each input port IP to each output port OP, and traffic measuring circuitry 214 that measures the traffic level, and the types of data packets, on the input ports IP1-Ipn. Router 210 further includes destination determining circuitry 216 that identifies the destinations that are served by the backbone providers, and congestion monitoring circuitry 218 that monitors the traffic conditions on the backbone providers.

Router 210 additionally includes a switch controller 220 that controls switching circuitry 212 and, there by, controls the output ports OP that are connected to the input ports IP. Switch controller 220 receives traffic information from traffic measuring circuitry 214 and a number of routing instructions for each input port IP. The routing instructions include fixed capacity, selected overflow capacity, real-time overflow capacity, and data-type capacity routing instructions.

Fixed capacity routing instructions relate to fixed blocks of bandwidth that a network user has purchased under a contract. The fixed capacity routing instructions for an input port IP identify the output ports OP that are to receive data packets from the input port IP, and the amount of capacity that can be transmitted to the output ports OP by the input port IP.

For example, assume that the ISP connected to input port IP1 purchases a 155 Mbps block of bandwidth from the backbone provider connected to output port OP2. In this case, the fixed capacity routing instruction indicates that traffic levels up to 155 Mbps of traffic can be routed from input port IP1 to output port OP2.

Selected overflow capacity routing instructions relate to usage-based bandwidth that the network user has selected to handle bursts of traffic that exceed the fixed blocks of bandwidth that have been purchased. The selected overflow capacity routing instructions for an input port IP identify the output port OP that is to receive the overflow traffic from the input port IP.

For example, assume that the ISP connected to input port IP1 purchases 155 Mbps of bandwidth from the backbone provider connected to output port OP2, and indicates that the backbone provider connected to output port OP1 is to handle its overflow traffic (traffic in excess of 155 Mbps). In this case, the selected overflow capacity routing instruction indicates that traffic levels over 155 Mbps are to be routed to output port OP1.

Real-time overflow capacity routing instructions relate to usage-based bandwidth where the network user has indicated that they wish to have bursts of traffic that exceed the fixed blocks of bandwidth carried by the best backbone provider that is available at the time additional capacity is needed. The real-time overflow capacity routing instructions for an input port IP identify the output port OP that is to receive the overflow traffic from the input port IP.

For example, assume that the ISP connected to input port IP1 purchases 155 Mbps of bandwidth from the backbone provider connected to output port OP2. Further assume that the backbone provider connected to output port OP3 is the best backbone provider at the time the overflow traffic from the ISP is present. In this case, the real-time overflow capacity routing instruction indicates that traffic levels over 155 Mbps are to be routed to output port OP3.

Data-type capacity routing instructions relate to usage-based bandwidth where the network user has indicated that they wish to have specific types of data, such as video, carried by the best backbone provider that is available at the time the data type is present. The data-type capacity routing instructions for an input port IP identify the output port OP that is to receive the type of data from the input port IP.

In operation, router 210 receives a data packet on an input port IP. Based on the traffic level and data type on the input port IP as indicated by traffic measuring circuitry 214, switch controller 220 controls switching circuitry 212 so that the data packet is routed to an output port OP. The output port OP, in turn, is defined by the fixed capacity routing instruction, the select overflow capacity routing instruction, the real-time overflow capacity routing instruction, or the data type capacity routing instruction.

In addition, when a network user has purchased multiple blocks of bandwidth, switch controller 220 can also use the level of traffic congestion as indicated by the congestion monitoring circuitry 218 to route the data packets among the available blocks of bandwidth.

For example, an ISP could purchase a 155 Mbps block of bandwidth from a first backbone provider, and a 32 Mbps block of bandwidth from a second backbone provider. If the ISP has 150 Mbps of data traffic and the first backbone provider is congested (such as when a router goes down), router 210 can transmit 32 Mbps onto the second backbone provider, and only 122 Mbps onto the more congested first backbone provider. Vendors such as Cisco provide routers.

As further shown in FIG. 2, system 200 includes a route optimizer 230. Route optimizer 230 includes a memory 232 that stores instructions and data, and a central processing unit (CPU) 234 that is connected to memory 232. Further, route optimizer 230 includes a memory access device 236, such as a disk drive or a networking card, which is connected to memory 232 and CPU 234. Memory access device 236 allows instructions and data to be transferred to memory 232 from an external medium, such as a disk or a networked computer. In addition, device 236 allows data from memory 232 or CPU 234 to be transferred to the external medium.

In addition, route optimizer 230 includes a display system 238 that is connected to CPU 234. Display system 238 displays images to an administrator which are necessary for the administrator to interact with the program. Route optimizer 230 also includes a user input device 240, such as a keyboard and a pointing device, which is connected to CPU 234. Input device 240 allows the administrator to interact with the program.

Route optimizer 230 executes a route optimizer algorithm that generates the fixed capacity, select overflow capacity, real-time overflow capacity, and data-type capacity routing instructions. Route optimizer 230 receives traffic information from traffic measuring circuitry 214, and fixed capacity sold instructions. In addition, route optimizer 230 receives selected capacity sold instructions, bandwidth seller instructions, and best provider instructions.

The fixed capacity sold instructions identify a network user that purchased a block of bandwidth, the backbone provider that sold the bandwidth, and the amount of capacity that has been purchased from the backbone provider. Utilizing this information, the route optimizer algorithm identifies the input port IP that is associated with the network user that purchased the capacity, and the output port OP that is associated with the backbone provider that sold the capacity. The route optimizer algorithm generates the fixed capacity routing instructions using the identified input port IP, the identified output port OP, and the capacity purchased.

The selected capacity sold instructions identify a network user and the backbone provider that has been selected to handle the overflow traffic. Utilizing this information, the route optimizer algorithm identifies the input port IP associated with the network user that selected the provider, and the output port OP of the backbone provider that will provide the overflow capacity. The route optimizer algorithm generates the selected overflow capacity routing instructions using the identified input port IP, and the identified output port OP.

The bandwidth seller instructions identify sellers that wish to sell usage-based bandwidth, and the cost of the usage-based bandwidth (including available discounts). The sellers include backbone providers that have usage-based capacity for sale as well as network users. Network users that have excess capacity on a backbone provider can sell the excess capacity on a usage basis.

Figure 3:
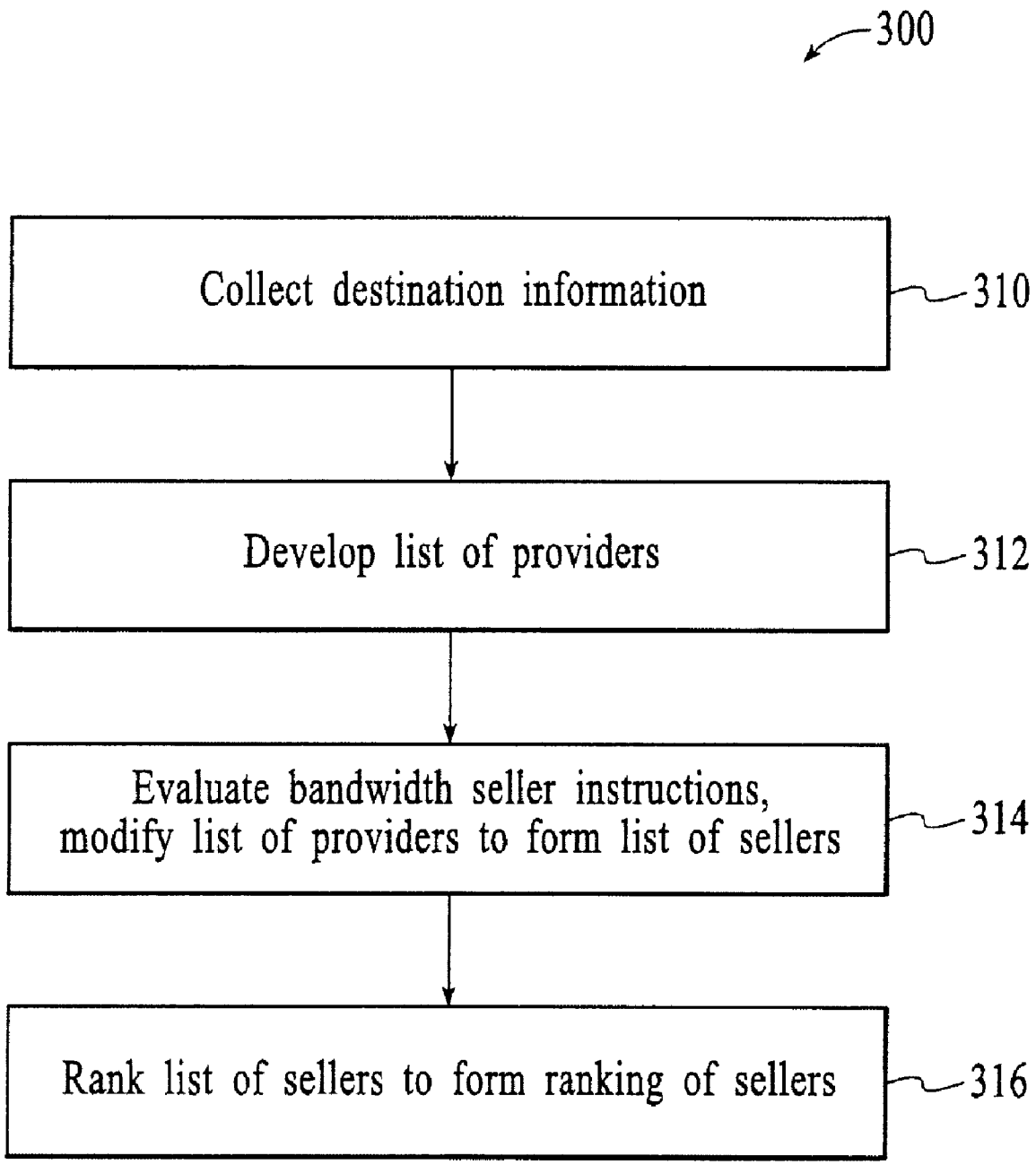
FIG. 3 is a flow chart illustrating a method 300 of determining the best backbone provider in accordance with the present invention.

The best provider instructions identify a network user that wishes to have their overflow traffic, or types of data, routed to the best backbone provider that is available at the time the additional capacity is needed, or the type of data is present. (ISPs can also choose to have all of their traffic routed to the best backbone provider.) The route optimizer algorithm determines the best backbone provider. FIG. 3 shows a flow chart that illustrates a method 300 of determining the best backbone provider in accordance with the present invention.

As shown in FIG. 3, method 300 begins at step 310 by collecting destination information from destination determining circuitry 216 to determine the end destinations that can be reached with the backbone providers. Utilizing this information, method 300 moves to step 312 to develop a list of backbone providers that provides service to each end destination.

Next, method 300 moves to step 314 to evaluate the bandwidth seller instructions. In addition, method 300 modifies the list of providers to form a list of sellers by removing backbone providers that do not have usage-based capacity available for sale, and updating the capacity that is available from sellers that have sold capacity. Further, method 300 adds network users to the list of sellers that have excess capacity on a provider that is on the list of providers.

For example, if only backbone providers A, B, and C provide service to a destination, but only backbone providers A and B have usage-based capacity for sale as indicated in the bandwidth seller instruction, then backbone provider C is removed from the list of sellers. In addition, if network users G and H have indicated that they wish to sell excess capacity on a usage basis, and users G and H have excess capacity on providers A and D, respectively, then only user G is added to the list of sellers.

The usage-based excess capacity available for sale by a network user varies from moment to moment, depending on the traffic level on the input port IP. Thus, a network user that has 100 Mbps of excess capacity at one moment may have no excess capacity at a next moment, or may have 150 Mbps of excess capacity at the next moment. The present invention allows even brief periods of excess bandwidth to be sold, rerouting data packets on a packet-by-packet basis.

Once the list of sellers has been formed, method 300 moves to step 316 to rank the sellers that have usage-based capacity for sale according to a factor from lowest to highest to form a ranking of sellers. One factor that can be utilized to rank the sellers is the cost of the bandwidth (including applicable discounts). In this case, the best backbone provider is the seller that has usage-based capacity on a backbone provider at the lowest cost.

Figure 4A:
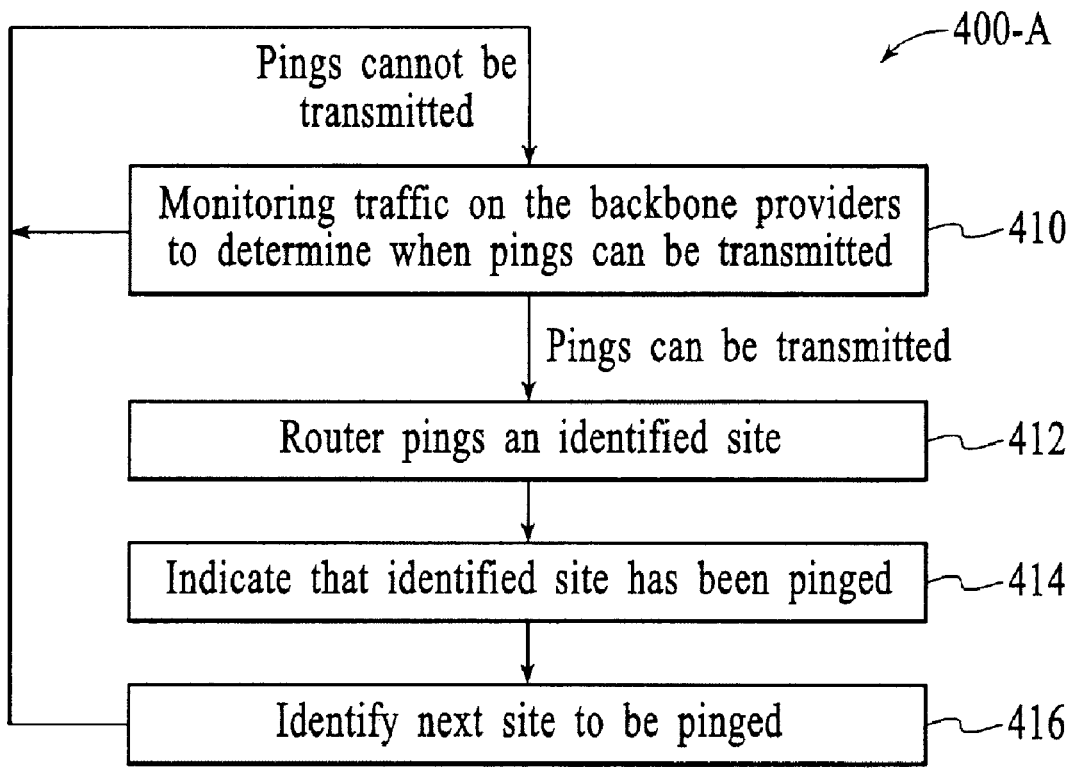
FIGS. 4A and 4B are flow charts illustrating methods 400A and 400B for determining response times in accordance with the present invention.
Figure 4B:
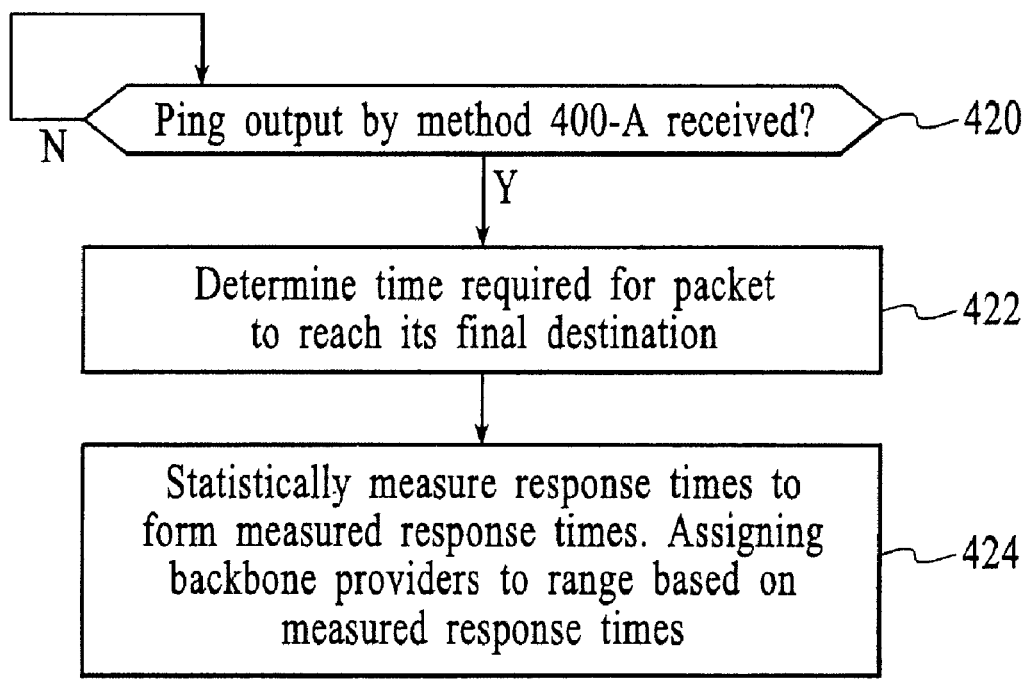

Another factor that can be utilized to rank the sellers is response times. The time it takes for a packet to reach its destination is an important factor and different networks have different response times for transferring information. FIGS. 4A and 4B show flow charts that illustrate methods 400A and 400B for determining response times in accordance with the present invention.

As shown in FIG. 4A, method 400-A begins at step 410 by monitoring the traffic that is on the backbone providers to determine when pings can be transmitted. When pings can be transmitted, method 400-A moves to step 412 where router 210 pings an identified site. Next, method 400-A moves to step 414 to indicate that the identified site has been pinged.

Following this, method 400-A moves to step 416 to identify a next site to be pinged. Destination information is collected from method step 310 (or from destination determining circuitry 216) to develop a list of end destinations that can be reached with the backbone providers. From the list of end destinations, method 400-A identifies a next site to be pinged using a predefined order.

Sites from the list of end destinations can be pinged in a repeating order. For example, the first through last sites could be pinged in a first to last order. Alternately, sites could be pinged in a non-repeating order using a criteria, such as total traffic volume, to vary the order. In this case, sites that received more traffic would be pinged more often. Once a next site has been identified method 400-A returns to step 410.

As shown in FIG. 4B, method 400-B begins at step 420 by determining whether a ping output by method 400-A has been received. When a ping has been received, method 400-B moves to step 422 to determine the time required for a packet to reach that destination over the pinged backbone provider. Thus, method 400-B continually measures the time required to send data to the destination on each of the backbone providers that provide service to the destination. If a direct measure of the time required to reach a destination is unavailable, then one-half of the round trip time can be used.

Following this, method 400-B moves to step 424 to statistically measure the response times to form a measured response time for each backbone provider for the different sites. The backbone providers are then assigned to different ranges of response times based on the measured response times. For example, all providers providing service to a destination in X mS or less are assigned to a first range. In addition, all providers providing service to the destination in Y mS down to X mS are assigned to a second range, while all providers providing service in Z mS down to Y mS are assigned to a third range.

The ranges, in turn, can correspond to different types of data. For example, video and voice over IP may require that data packets be delivered within X mS. In addition, basic corporate traffic may require that data packets be delivered within Y mS, while standard ISP traffic may require that data packets not take any longer than Z mS.

By defining ranges of traffic, the present invention is able to provide guaranteed levels of service based on the amount of time required for a packet to reach its destination. For example, system 200 can guarantee that 99.99% of all video and voice over IP packets will reach their final destination within X mS. System 200 can also guarantee that 99.99% of all corporate traffic will reach its final destination within Y mS, and all basic ISP traffic within Z mS.

Guaranteed levels of service allow up-market, business ISPs or ISPs with many Web hosts to choose to have all of their traffic reach its destination within a time limit, or set time limits within which certain types of their traffic should be delivered. This will ensure that their traffic is routed over the backbone provider that has the best connection with the destination site. In addition to routing overflow traffic based on cost, residential ISPs may be interested in upgrading their service to allow certain applications, such as video conferencing, to reach their end destinations within set time limits.

Further, corporate virtual private networks (VPNs), which typically use leased lines, can utilize guaranteed levels of service. The cost of running a VPN is becoming increasingly expensive as companies look to use their dedicated infrastructure to carry increasingly complex and bandwidth hungry applications, such as video conferencing. This is forcing up the amount of bandwidth the VPNs require despite the fact that the VPNs may only need this large bandwidth for short periods of time. Thus, by providing guaranteed transit times, VPNs can utilize system 200 to transmit time sensitive packets.

In addition, guaranteed levels of service provide benefits to telephone companies using voice over IP (VoIP). Telephone companies within Europe and North America send most international voice traffic over IP backbones. Theo insure that there is no degradation to the voice service from bursty data, separate IP links are set up to carry the voice signal. Thus, by guaranteeing a level of service, the voice signal need not be sent over a separate IP link.

System 200 can only provide quality of service guarantees for outbound traffic from the exchange in which it is installed. For example, a user may request to see a Web page, and this request may be sent at the highest grade of service to the end Web host. However, the response will only be sent back at the speed provided by the host's backbone provider.

On the other hand, if system 200 is installed at both exchanges, then a guaranteed level of service can be provided for both outbound and inbound traffic. This is beneficial to ISPs, but the greatest beneficiaries are companies setting up VPNs as this allows the companies to send traffic between platforms without setting up leased lines.

Figure 5:
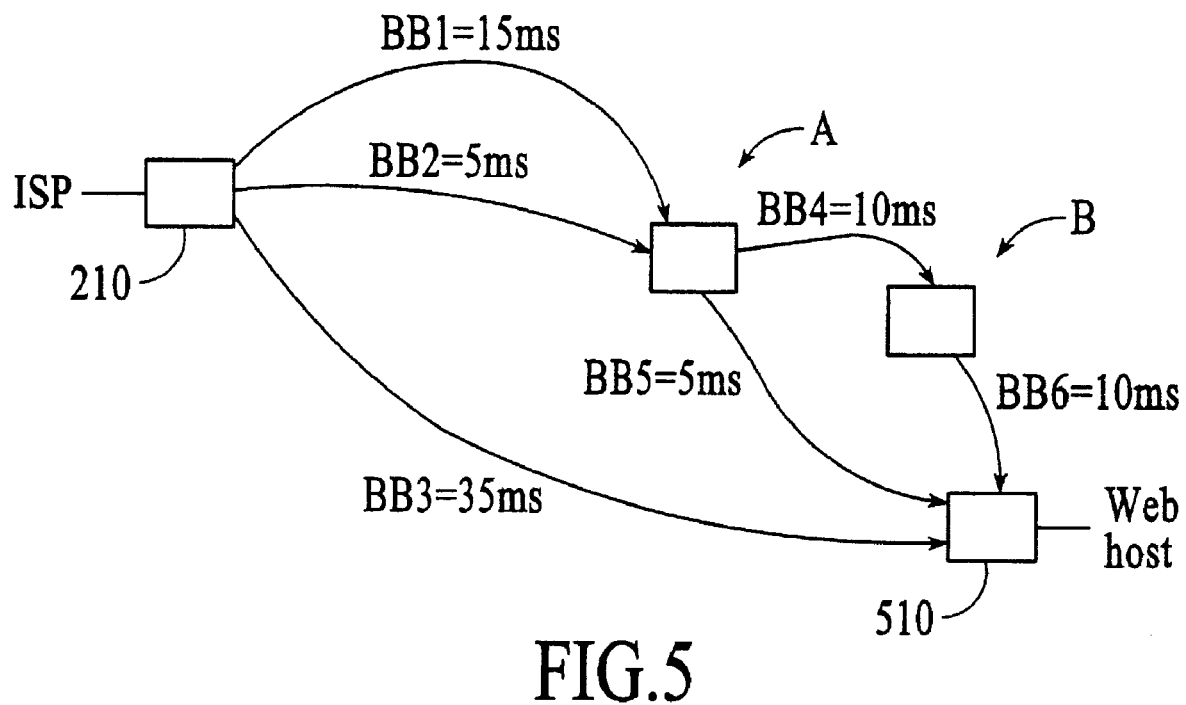
FIG. 5 is a flow diagram illustrating response time measurement in accordance with the present invention.

This guarantee can even take into account the complex hierarchal structure of the public internet. FIG. 5 shows a flow diagram that illustrates response time measurement in accordance with the present invention. As shown in FIG. 5, six backbone providers BB1-BB6 provide various segments of a route from router 210 to an end destination 510.

Specifically, router 210 is connected to backbone providers BB1, BB2, and BB3. Backbone provider BB1 has a peering arrangement with backbone provider BB5 at point A. Backbone provider BB5, in turn, is connected to the end destination 510. In addition, backbone provider BB2 has a peering arrangement with backbone provider BB4 at point A, while backbone provider BB4 has a peering arrangement with backbone provider BB6 at point B. Backbone provider BB6, in turn, is connected to the end destination 510.

After a site has been pinged a statistically significant number of times, method 400-B could determine, for example, that it requires 20 mS for a ping to reach end destination 510 when sent via backbone provider BB1. The 20 mS, in turn, could require 15 mS for the ping to reach point A, and another 5 mS for the ping to reach the end destination via backbone provider BB5.

Method 400-B could also determine, for example, that it requires 25 mS for a ping to reach end destination 510 when sent via backbone provider BB2. The 25 mS, in turn, could require 5 mS for the ping to reach point A, 10 mS for the ping to reach point B via backbone provider BB4, and another 10 mS for the ping to reach the end destination via backbone provider BB6. Further, it could additionally require 35 mS for a ping to reach end destination 510 when sent via backbone provider BB3, which has the only direct connection. As a result, backbone provider BB1 provides the time-optimal choice.

Method 400-B also utilizes traffic condition information from congestion monitoring circuitry 218 to determine response times. Thus, if congestion occurs on, for example, backbone provider BB5, the statistics quickly reflect this change. As a result, backbone provider BB1 would drop from being the best to being the worst choice.

The cost and response time rankings can be used alone, in combination, or in combination with other factors to determine the best backbone provider at each moment in time. For example, an ISP purchasing video service would have packets routed on the least expensive provider of all of the providers meeting the response time criteria. When used with other factors, the network user provides the appropriate weighting.

In addition, rather than purchasing a fixed amount of bandwidth and electing to have overflow traffic routed across the best provider at the time, a network user can also elect to have all of their traffic delivered within a time limit. Alternately, the network user can elect to have types of traffic delivered within different time limits.

The present invention changes the public internet from a heterogeneous system of proprietary networks with an inconsistent performance to one where there is differentiated price associated with different grades of service. Although some prioritization or queuing techniques, such as Orchestream, exist for providing different levels of service, these solutions only work when implemented across an end-to-end network over which the packets have to travel.

Figure 6:
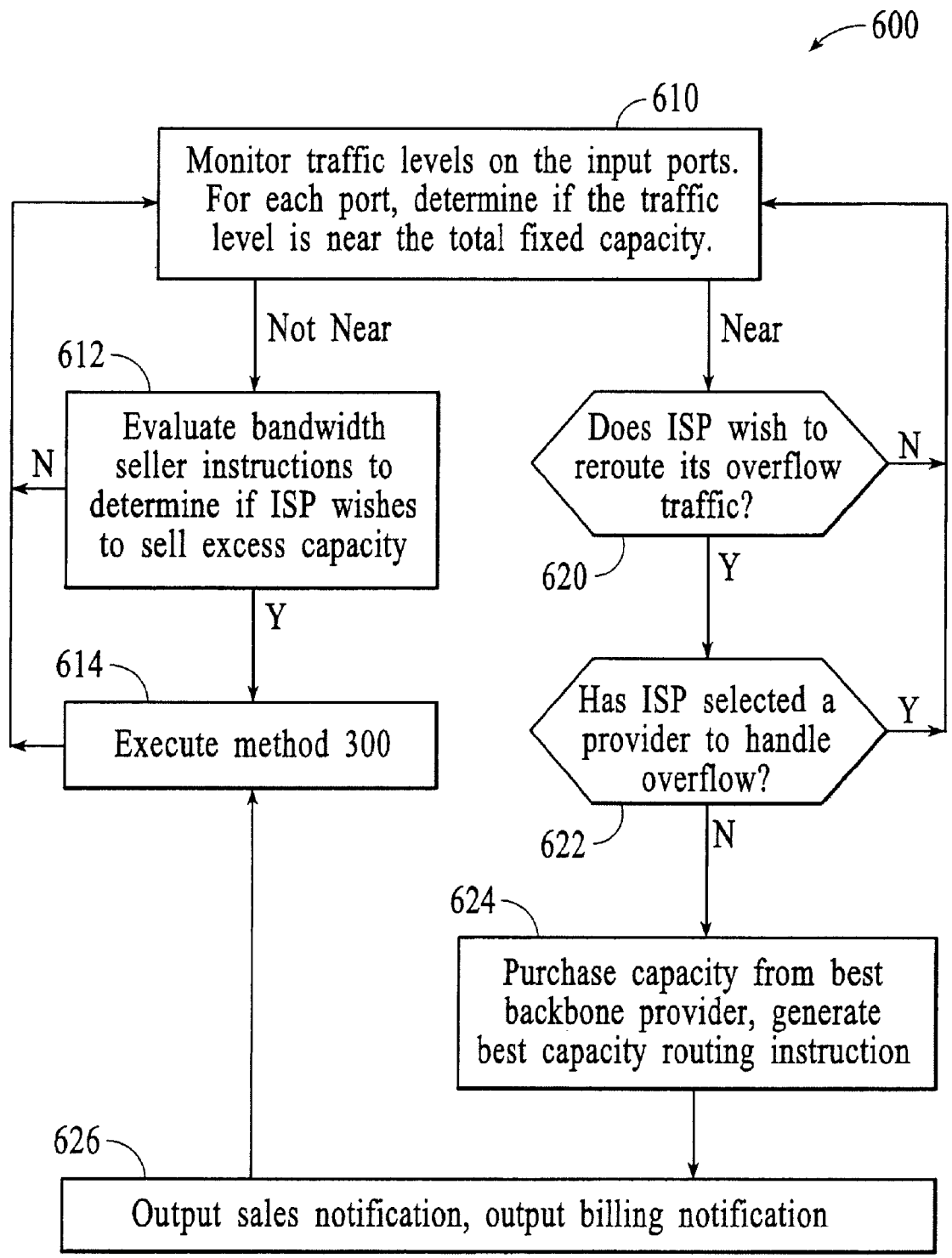
FIG. 6 is a flow chart illustrating a method 600 of operating route optimizer 230 in accordance with the present invention.

FIG. 6 shows a flow chart that illustrates a method 600 of operating route optimizer 230 in accordance with the present invention. As shown in FIG. 6, method 600 begins at step 610 by monitoring the traffic levels on the input ports IP using the traffic level information output by traffic measuring circuitry 216. For each input port IP, method 600 determines if the traffic level is near the total of the fixed capacity blocks of bandwidth that have been purchased.

If the traffic level is not near the total fixed capacity bandwidth that has been purchased, method 600 moves to step 612 where the route optimizer algorithm evaluates the bandwidth seller instructions to determine if the ISP connected to the input port IP wishes to sell excess capacity. If the ISP does not wish to sell excess capacity, method 600 returns to step 610. If the ISP does wish to sell excess capacity, method 600 moves to step 614 where the route optimizer algorithm runs method 300 to update the ranking of sellers, and then returns to step 610.

If the traffic level is near the total fixed capacity bandwidth that has been purchased, method 600 moves to step 620 where the route optimizer algorithm determines whether the ISP connected to the input port IP wishes to reroute its overflow traffic. If the ISP does not wish to reroute its overflow traffic, method 600 returns to step 610.

If the ISP does wish to reroute its overflow traffic, method 600 moves to step 622 where the route optimizer algorithm determines if the ISP has selected a backbone provider to handle its overflow traffic. If the ISP has selected a backbone provider to handle its overflow traffic (where the selected overflow capacity routing instruction controls the routing), method 600 returns to step 610.

If the ISP has not selected a backbone provider to handle its overflow traffic, method 600 moves to step 624 where the route optimizer algorithm purchases capacity from the best backbone provider in the ranking of sellers. This real-time purchase and sale of bandwidth allows sellers the opportunity to sell capacity from moment to moment. This, in turn, allows sellers to sell significantly more of their capacity than when sellers must sell blocks of bandwidth for typically at least a month. With more bandwidth available, the cost of IP transit should fall.

In addition to purchasing capacity from the best backbone provider, method 600 generates a real-time overflow capacity routing instruction that identifies the best backbone provider. This real-time routing of excess traffic onto output lines OL where additional capacity has just been purchased allows network users the ability to buy and sell bandwidth in real time.

The real-time purchase and sale of bandwidth, and the real-time routing of excess traffic over the bandwidth purchased in real time, more efficiently utilizes-the bandwidth than the current practice where blocks of bandwidth are sold under contracts that range from one month to one year in length. A more efficient utilization of the bandwidth, in turn, reduces the IP transit costs for the participating network users.

Returning to FIG. 6, method 600 next moves to step 626 where the route optimizer algorithm outputs a sales notification and a billing notification. Next, method 600 moves to step 614 where the route optimizer algorithm runs method 300 to update the ranking of sellers (to remove the capacity that was sold), and then returns to step 610.

As further shown in FIG. 2, system 200 includes a trading platform 250. Trading platform 250 includes a memory 252 that stores instructions and data, and a central processing unit (CPU) 254 that is connected to memory 252. Further, trading platform 250 includes a memory access device 256, such as a disk drive or a networking card, which is connected to memory 252 and CPU 254. Memory access device 256 allows instructions and data to be transferred to memory 252 from an external medium, such as a disk or a networked computer. In addition, device 256 allows data from memory 252 or CPU 254 to be transferred to the external medium.

In addition, trading platform 250 includes a display system 258 that is connected to CPU 254. Display system 258 displays images to an administrator which are necessary for the administrator to interact with the program. Trading platform 250 also includes a user input device 260, such as a keyboard and a pointing device, which is connected to CPU 254. Input device 260 allows the administrator to interact with the program.

Trading platform 250 executes a trading algorithm that matches buyers and sellers of bandwidth. Trading platform 250 receives network user instructions and backbone provider instructions. The network user instructions indicate the fixed capacity blocks of bandwidth that a network user has been purchased outside of system 200, and the price and quality requirements of the network user for buying additional capacity. The quality requirements can include, for example, a desired response time and a minimum acceptable response time. In addition, the network user instructions also indicate a network users price requirements to sell their own excess capacity.

The backbone provider instructions indicate the fixed capacity and usage-based charges of a backbone provider (along with terms and conditions such as contract length). The charges can include, for example, discounts based on volume and time of day. The network user and backbone provider instructions are input to trading platform 250 via a number of input screens that are accessed via a network, such as the internet.

The trading algorithm utilizes the network user and backbone provider instructions to develop trader information. The trader information includes lists of backbone providers that have fixed capacity for sale, and lists of backbone providers that have usage-based capacity for sale. The lists include the cost of the bandwidth, and can be sorted and arranged according to specific factors, such as quality.

The trading algorithm also utilizes data from route optimizer 230 to develop additional trader information. The additional trader information can include rankings of sellers provided by route optimizer 230 as well as usage based data. The usage based data can include best capacity bandwidth that has been sold (as indicated by the sales notification output at step 426), and traffic profiles that are viewable over a number of time periods. The trader information can further include recommendations for all or any portion of the total bandwidth utilized by a network user. The trading information is accessed by network users and backbone providers via a network such as the internet.

The trading algorithm also provides a means for a network user to purchase, such as by point-and-click, fixed capacity and usage-based bandwidth from a specific provider or a recommended provider, and to also receive confirmation of the sale. The network user can also indicate that they wish to have their overflow capacity routed to the best backbone provider that is available when the additional capacity is needed. The trading algorithm also provides information that indicates the fixed capacity bandwidth that has been purchased, and the usage-based bandwidth that is to be purchased to handle the overflow traffic.

When network users purchase fixed capacity from backbone providers, the trading algorithm outputs the fixed capacity sold instructions and a sold fixed capacity notification.

When network users select specific backbone providers to provide overflow capacity, the trading algorithm outputs the selected capacity sold instructions and a sold selected capacity notification. When network users indicate that they wish to use the best backbone provider to handle their overflow capacity, the trading algorithm outputs the best provider instructions. In addition, the trading algorithm outputs the bandwidth seller instructions each time bandwidth is bought or sold.

Conventional trading platforms for matching user requirements to market offerings can be modified to implement the trading algorithm running on trading computer 250.

As further shown in FIG. 2, system 200 also includes a billing system 270 that provides fixed capacity and usage based billing. Billing system 270 includes a number of sniffers 272 that non-intrusively extract packet header and payload information from all the data streams between the input ports IP and the output ports OP.

Billing system 270 also includes a number of aggregators 274 and a mediator 276. Each aggregator 274 collects the raw transaction data from a number of sniffers 272, while mediator 276 formats and compresses the raw transaction data into useful billing data. The billing data, which includes sender and receiver information, identifies data packets that have been routed according to fixed contracts as well as overflow packets that have been rerouted. Vendors such as Narus, Xacct and Belle Systems provide mediation systems.

Billing system 270 further includes a biller 278 that includes a memory 280 that stores instructions and data, and a central processing unit (CPU) 282 that is connected to memory 280. Further, biller 278 includes a memory access device 284, such as a disk drive or a networking card, which is connected to memory 280 and CPU 282. Memory access device 284 allows instructions and data to be transferred to memory 280 from an external medium, such as a disk or a networked computer. In addition, device 284 allows data from memory 280 or CPU 282 to be transferred to the external medium.

In addition, biller 278 includes a display system 286 that is connected to CPU 282. Display system 286 displays images to an administrator which are necessary for the administrator to interact with the program. Biller 278 also includes a user input device 288, such as a keyboard and a pointing device, which is connected to CPU 282. Input device 288 allows the administrator to interact with the program.

Biller 278 executes a billing algorithm that utilizes the billing data output by mediator 276, the sold fixed capacity and sold selected capacity notifications output by trading platform 250, and the billing notification output by route optimizer 230 to generate charges for the transactions in near real time. The charges reflect data packets that were actually output to a backbone provider, not the indications of a sale from route optimizer 230.

The billing algorithm utilizes rules to define tariffs, plans, and discounts using billing events that include the type of application, such as file transfer, browser, and streaming media. In addition, the bandwidth allocated, the total bytes transferred, the time of day, the quality of service requested and delivered, and the priority are additional billing events that are used.

The billing algorithm also generates paper and/or electronic billing statements from the charges that provide both up to the minute charges as well as monthly or other periodic summaries. The billing statements can include personalized levels of summarization and itemization. The billing algorithm also provides a means for electronic bill payment using credit cards, direct debits, bank giros, checks, or via the web.

The billing statements and electronic bill payment are viewable via a network such as the internet.

The billing algorithm also provides inquiry screens so that customers and customer care representatives can review the transactions. The billing algorithm also provides credit control and collections, inventory of equipment, and on-line real-time provisioning of routers and switches. The billing algorithm further includes management capabilities such as order entry, invoice reconciliation, commission calculation, reporting, and security capabilities. Vendors such as Portal, Geneva, and Solect provide billing systems.

Each network user has a traffic profile that is formed by graphing the traffic level of an input data stream against the time of day. By adding the total of the fixed capacity blocks to the graph, a peak profile can be defined as the traffic levels that lie above the total of the fixed capacity blocks.

The network users have similar peak profiles, partially overlapping peak profiles, and non-overlapping peak profiles. The more network users that have a non-overlapping peak profile, the greater the likelihood that a real-time transaction can be completed.

One way to obtain non-overlapping peak profiles is to accept incoming data streams IN from network users that focus on different customer groups, such as business and residential groups. The traffic profiles of predominantly residential ISPs are very different from business ISPs.

Figure 7:
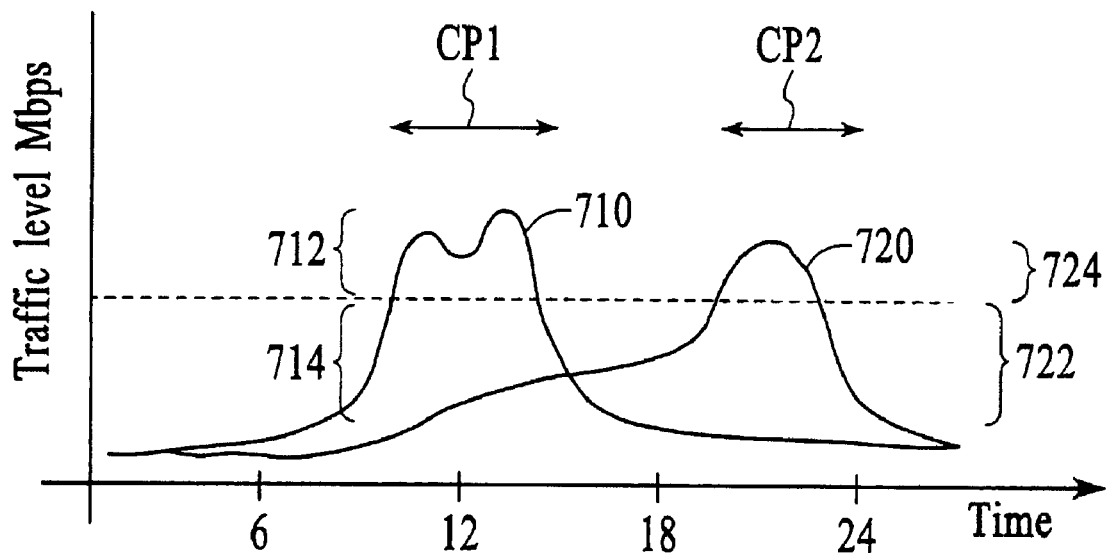
FIG. 7 is a graph illustrating a business traffic profile 710 and a residential traffic profile 720 in accordance with the present invention.

FIG. 7 shows a graph that illustrates a business traffic profile 710 and a residential traffic profile 720 in accordance with the present invention. As shown in FIG. 7, business traffic profile 710 has a peak profile 712 that lasts between about 10:00 to 14:00 hours, and excess capacity 714 to sell between about 19:00 to 23:00 hours.

In addition, residential traffic profile 720 has excess capacity 722 to sell between about 10:00 to 14:00 hours, and a peak profile 724 between about 19:00 to 23:00 hours. Thus, during a first complementary period CP1, the network user that outputs residential traffic profile 720 has as excess substantially all of the capacity that is needed by the network user that outputs business traffic profile 710.

Similarly, during a second complementary period CP2, the network user that outputs business traffic profile 710 has as excess substantially all of the capacity that is needed by the network user that outputs residential traffic profile 710. Thus, FIG. 7 shows that non-overlapping peak profiles can be obtained by accepting incoming data streams IN from network users that focus on different customer groups.

Thus, a system and a method for real-time buying and selling of excess bandwidth, real-time routing of excess traffic over bandwidth purchased in real time, and billing of the transactions have been described. The system and method of the present invention provide numerous advantages over the fixed contract approach that is commonly used in the industry.

One of the advantages of the present invention is that it allows network users the ability to both pay a fixed capacity fee and a usage-based fee. The fixed capacity fee provides a network user with a fixed amount of network capacity to carry the bulk of their traffic, while the usage-based fee provides for peak traffic periods.

The usage-based fee removes the need to over dimension the network, and also insures the network user that they can handle peak traffic periods. As a result, network users can buy less fixed capacity. For example, instead of purchasing a fixed capacity level which is twice the average traffic level, where there is only a 50% utilization, network users of system 200 can buy less fixed capacity and can there fore realize, for example, an 80% utilization. The net result is a cost-effective solution for network users. (The amount of fixed capacity that is optimal for each network user varies according to their traffic profile.)

Another significant advantage to network users of system 200 is that network users can sell any spare capacity on their links on a real time basis. Network users can also choose a combination of fixed capacity and usage based services, depending on their traffic profiles and traffic volumes.

An advantage to network providers is that system 200 offers network providers a way to offer usage-based charges, such as on a "per gigabit transferred basis." This eliminates the need for the network provider to develop this ability in house.

It should be understood that various alternatives to the embodiment of the invention described herein may be employed in practicing the invention. Thus, it is intended that the following claims define the scope of the invention and that methods and structures within the scope of these claims and their equivalents be covered thereby.

What is claimed is:

1. A system for routing internet traffic over a plurality of internet links, the system comprising:
    a plurality of input ports to receive incoming data packets;
    a plurality of output ports connected to a plurality of internet links, wherein each output port is connected to an associated internet link and wherein each of the associated Internet links is coupled to at least one additional internet link;
    switching circuitry, coupled to the plurality of input ports and the plurality of output ports, to couple input ports to selected output ports in response to control signals; and
    controller circuitry to generate the control signals using routing instructions; and
    an internet route optimizer, coupled to the controller circuitry, to generate routing instructions for incoming data packets using a ranked list of the internet links which are connected to the plurality of output ports and serve the predetermined destination, wherein the internet route optimizer generates the ranked list of the internet links using:
    (1) financial costs of routing data packets over the internet links, wherein the financial costs of routing data packets over the internet links corresponds to only financial costs associated with routing data packets over the internet links which are connected to the plurality of output ports,
    (2) a delay associated with routing packets over the internet links, wherein the delay associated with routing packets over the internet links is representative of an amount of time between when a packet is sent over the internet link and when the packet arrives at the predetermined destination, and
    (3) a type of data of the incoming data packets, wherein the type of data is indicative of a content of the data of the incoming data packet.

2. The system of claim 1 wherein the system determines the amount of time between when a packet is sent over a given internet link and when the packet arrives at a predetermined destination by pinging the predetermined destination over the given internet link.

3. The system of claim 2 wherein a frequency of pinging a given destinations, via one or more of the plurality of internet links, is variable.

4. The system of claim 1 wherein the system pings a plurality of predetermined destinations, via the plurality of internet links, in a repeating order.

5. The system of claim 1 wherein the system pings a plurality of predetermined destinations, via the plurality of internet links, in a non-repeating order.

6. The system of claim 1 wherein the types of data include video, voice over IP, and ISP traffic.

7. The system of claim 1 further including:
circuitry to receive information which is representative of assigning a type of data of the incoming packet to a level of service, wherein the internet route optimizer generates the ranked list of the internet links which are connected to the plurality of output ports and serve the predetermined destination using:
 (1) the financial costs of routing data packets over the internet links,
 (2) the delay associated with the internet links serving the predetermined destination,
 (3) the type of data of the incoming data packets, wherein the type of data is indicative of a content of the data of the incoming data packet, and
 (4) the level of service assigned to the type of data of the incoming data packet, wherein the level of service corresponds to an amount of time required for the type of data of the incoming packet to reach the predetermined destination.

8. The system of claim 1 further including circuitry to determine an available bandwidth capacity of the internet links and wherein internet route optimizer generates the ranked list of the internet links which are connected to the plurality of output ports and serve the predetermined destination using:
 (1) the financial costs of routing data packets over the internet links,
 (2) the delay associated with routing packets over the internet links,
 (3) the type of data of the incoming data packets, wherein the type of data is indicative of a content of the data of the incoming data packet, and
 (4) available bandwidth capacity of the internet links.

9. A method of generating a routing instruction to route an incoming data packet of internet traffic to a predetermined destination using an internet routing system having (i) at least one input port to receive the incoming data packet and (ii) a plurality of output ports connected to a plurality of internet links, wherein each of the plurality of output ports is connected to an associated internet link and wherein each of the associated internet links is coupled to at least one additional internet link, the method comprising:
 determining a type of data of the incoming data packets;
 determining a delay for the internet links serving the predetermined destination, wherein the delay corresponds to an amount of time between when a packet is sent over the internet link and when the packet arrives at the predetermined destination;
 generating a ranked list of internet links which are connected to the plurality of output ports and serve the predetermined destination using:
  (1) financial costs of routing data packets over the internet links, wherein the financial costs of routing data packets over the internet links corresponds to only financial costs associated with routing data packets over the internet links which are connected to the plurality of output ports,
  (2) the delay associated with the internet links serving the predetermined destination, and
  (3) the type of data of the incoming data packets, wherein the type of data is indicative of a content of the data of the incoming data packet; and
 routing incoming data packets in accordance with the ranked list of internet links.

10. The method of claim 9 further including circuitry determining an available bandwidth capacity of the internet links and wherein generating the ranked list of the internet links which are connected to the plurality of output ports and serve the predetermined destination uses:
 (1) the financial costs of routing data packets over the internet links,
 (2) the delay associated with the internet links serving the predetermined destination,
 (3) the type of data of the incoming data packets, and
 (4) available bandwidth capacity of the internet links.

11. The method of claim 9 wherein the types of data include video and voice over IP.

12. The method of claim 9 further including receiving information which is representative of assigning a type of data of the incoming packet to a level of service.

13. The method of claim 12 wherein the level of service corresponds to a threshold or range of an amount of time required for the type of data of the incoming packet to reach the predetermined destination.

14. The method of claim 12 wherein: (i) the level of service corresponds to an amount of time required for the type of data of the incoming packet to reach the predetermined destination, and (ii) generating the ranked list of the internet links which are connected to the plurality of output ports and serve the predetermined destination uses:
 (1) the financial costs of routing data packets over the internet links,
 (2) the delay associated with the internet links serving the predetermined destination,
 (3) the type of data of the incoming data packets, and
 (4) the level of service assigned to the type of data of the incoming data packet.

15. The method of claim 9 further including receiving information which is representative of the financial costs of routing data packets over the internet links.

16. The method of claim 9 wherein method further includes determining a type of data of the incoming data packets.

17. The method of claim 9 wherein determining a delay for the internet links serving a predetermined destination includes pinging the predetermined destination via the internet links serving the predetermined destination.

18. The method of claim 17 wherein pinging the predetermined destination via the internet links serving the predetermined destination further includes pinging the predetermined destination, via the internet links serving the destination, in a repeating order during operation of the system.

19. The method of claim 17 wherein pinging the predetermined destination via the internet links serving the predetermined destination further includes pinging the predetermined destination, via the Internet links serving the destination, in a non-repeating order during operation of the system.

20. The method of claim 17 wherein pinging the predetermined destination further includes pinging a given destination, via one or more of the plurality of internet links, via a variable frequency.

21. The method of claim 9 further including assigning each of the internet links serving the predetermined destination to one of a plurality of ranges of response times.

22. The method of claim 21 further including receiving information which is representative of assigning a type of data of the incoming packet to a level of service wherein the level of service corresponds to an amount of time required for the type of data of the incoming packet to reach the predetermined destination.

* * * * *